Oct. 12, 1965 R. C. BARON ETAL 3,211,928

ELECTRONIC SWITCHING DEVICE

Filed May 17, 1963 2 Sheets-Sheet 1

INVENTORS
ROBERT C. BARON
GEORGE J. FLYNN

BY

Rosen & Schiller

ATTORNEYS

Oct. 12, 1965 R. C. BARON ETAL 3,211,928

ELECTRONIC SWITCHING DEVICE

Filed May 17, 1963 2 Sheets-Sheet 2

INVENTORS
ROBERT C. BARON
GEORGE J. FLYNN

BY Rosen & Schiller
ATTORNEYS

United States Patent Office 3,211,928

Patented Oct. 12, 1965

3,211,928

ELECTRONIC SWITCHING DEVICE

Robert C. Baron, Framingham, and George J. Flynn, Boston, Mass., assignors to Computer Control Company, Inc., Framingham, Mass., a corporation of Delaware Filed May 17, 1963, Ser. No. 281,153
6 Claims. (Cl. 307—88.5)

This invention relates to electronic circuits and more particularly to improved electronic switching devices.

Transistors, such as the junction type, have found extensive use as electronic switches. For example, the emitter and collector of a transistor can be considered the switch contacts, the base then being the switch control for opening and closing the contacts. An ideal switch can be defined as one which, at least in one aspect, displays no voltage drop between its input and output during conduction, i.e. the ON state. Similarly, when the switch is "open" or OFF, it should exhibit effectively infinite resistance. This aspect of the switching properties of transistors is important where the switching of low-level signals is involved, such as in analog signal switching, multiplexing, digital-to-analog conversion, and the like. Applying the criteria of an ideal switch to a practical transistor device, a good low-level switch should be capable of having its input and output circuits connected with a minimum impedance and minimum voltage drop when switched ON, and capable of preventing, or at least minimizing, current flow between the input and output when switched OFF. The switch should be a passive element in the sense that its current-carrying characteristics during either the ON or OFF state should be relatively invariant, i.e. independent of the parameters of the signal being switched. In a transistor configuration wherein the collector and emitter are used as switch contacts and the base as the control, excellent switching properties can be achieved with respect to low-level voltage signals which remain substantially constant during switch-conduction, for example, by the technique of providing a constant base current set at a level determined by the load current of the transistor. This technique is detailed in the article "Performance of a Transistor as a High-Accuracy Switch" by Baron and Bothwell, I.R.E. Transaction of the Performance Group on Circuit Theory, Volume CT–8, No. 1, March 1961, pages 82–84.

If one examines typical $V_{CE}$ vs. $V_C$ characteristics for an alloy junction transistor, it will be seen that where, during collector-emitter conduction the input voltage $V_{IN}$ is fixed, there is a specific value of base current at which $V_{CE}$ essentially is zero. However, if the input voltage is one which varies during conduction, switching of such a signal with a high degree of accuracy presents a difficult problem. By definition, in an ideal switch $V_{CE}=0$ for any value of $V_{IN}$. In a transistor switch of the type described, the current supply to a load in the transistor output will vary as a function of the input voltage. If the input voltage changes, the load current will also change. Hence, a fixed base drive will not compensate adequately to provide the desired high-precision switching.

A primary object of the present invention is therefore to provide a transistor switching device capable of switching variable voltage signals with a high degree of accuracy. Other objects of the present invention are to provide such a transistor switching device in which the control current is varied to provide a substantially zero switching error (effectively zero voltage drop across the transistor output and input) during changes in the voltage of the input signal; to provide a transistor switching device of the type described in which the control current is a function of the voltage signal to the switch input; and to provide a transistor switching device of the type described in which the magnitude of the control current is a direct function of the absolute magnitude of the input signal voltage.

Yet other objects of the present invention are to provide a transistor switching device of the type described which is particularly useful with circuits wherein a signal and its complement are both present, to provide a device of the type described wherein the control current is generated from means operating on the inverted signal; to provide a transistor switching device of the type described wherein the control current is provided by means for generating a variable current as a function of the inverted signal, means for summing the variable current with a fixed current so that the summed current, which constitutes the control current, is a direct function of the absolute value of the signal voltage; and to provide transistor switching means of the type described wherein switching is alternated between at least a pair of channels according to the polarity of the input signal voltage.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

Figure 1:
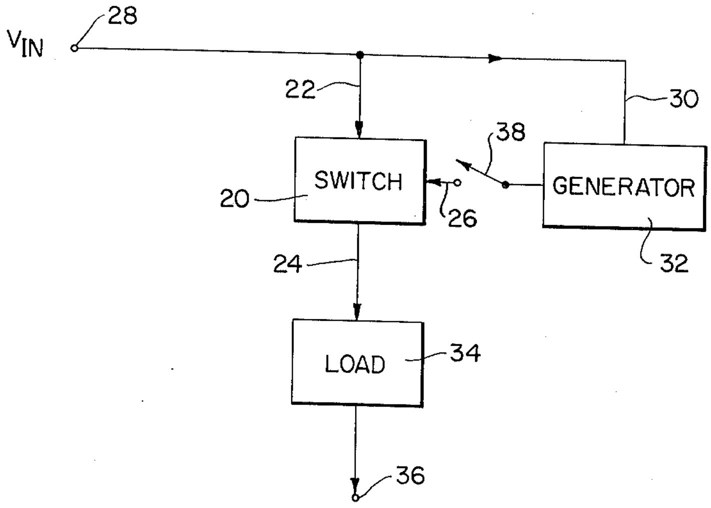
FIG. 1 is a block diagram showing the general form of one embodiment of the present invention.

Referring now to the drawings wherein like numerals denote like parts, in FIG. 1 there is seen a schematic block diagram of the present invention in which a switching transistor, shown generally at 20, includes input lead 22, output lead 24 and control lead 26, all connected to appropriate transistor terminals. The circuit of FIG. 1 also includes input terminal 28 to which the signal to be switched is intended to be applied. Terminal 28 is connected to input lead 22 and also to input lead 30 of means 32 for generating a control current. The latter means is coupled so that its output is connected to control lead 26. The circuit of FIG. 1 also is shown as including load 34 located in output lead 24 between transistor 20 and circuit output terminal 36.

In operation, a voltage $V_{IN}$ is applied to terminal 28 and thus to input leads 22 and 30 respectively of switching transistor 20 and generator means 32. Generator means 32 is characterized in providing an output current $I_B$ which varies as a direct function of the absolute magnitude of the input voltage, i.e. the current provided to control lead 26 will remain at a predetermined value for a steady state $V_{IN}$, but increase or decrease as a function of the respective increase or decrease in the magnitude of $V_{IN}$. Generator 32 operates such that for any $V_{IN}$ in a given range of input voltages, there is provided a corresponding $I_B$ which insures a constant or preferably zero voltage drop or even a predetermined $\pm\Delta$ voltage-drop across transistor 20 between input and output leads 22 and 24. $I_B$ is applied at control terminal 26 of switch 20 thereby "closing" the latter, as by closure of switching means 38 located between generator 32 and switch 20. It will be appreciated that switch 38 can be any type of switching device, e.g. electronic, electromechanical, etc., capable of selectively coupling and uncoupling generator 32 with control lead 26. Hence, when $I_B$ is permitted to flow at lead 26, a signal can be switched from input terminal 28 to output terminal 36 through load 34 by transistor 20 without any change in voltage across transistor 20 and regardless of fluctuations within the given range in the magnitude of the input signal.

Figure 2:
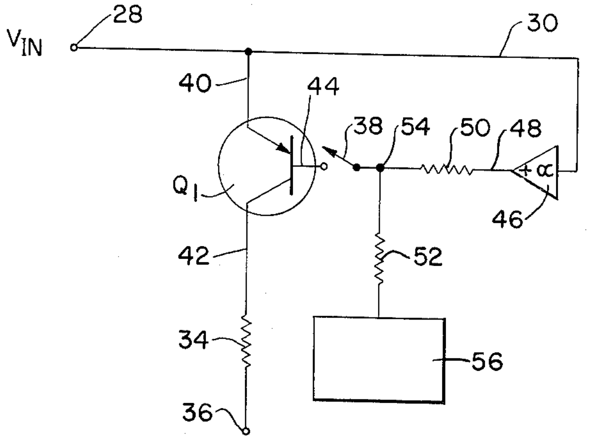
FIG. 2 is a schematic circuit diagram of a more detailed form of the embodiment of FIG. 1.

Referring now to FIG. 2, there will be seen a detailed schematic circuit diagram of one embodiment of the present invention wherein switching transistor 20 of FIG. 1 is shown as transistor $Q_1$. Transistor $Q_1$, illustrated as a pnp transistor, has the requisite input, output and control leads respectively denoted as emitter 40, collector 42 and base 44. Because it is intended that the input signal $V_{IN}$ to be switched be applied to emitter 20, and load resistance 34 is in the collector circuit, it will be recognized that the transistor is intended to operate in the inverted mode. Emitter 40 is thus connected to input terminal 28, and collector 42 is connected through resistor 34 to output terminal 36.

In the embodiment of FIG. 2, the means (corresponding to 32 of FIG. 1) for generating the control current comprises amplifier 46 having its input lead 30 connected to input terminal 28, and its output lead 48 connected through a resistor 50 to summing junction 54. In this embodiment, amplifier 46 is a non-inverting, D.C. amplifier with a gain $\alpha$ preferably greater than unity. The generating mean also includes a substantially constant current source, for example, comprising resistor 52 having one terminal connected to summing junction 54 and its other terminal connected to constant high voltage source 56 of known type. Junction 54 is connectable to base 44 through switching means 38.

The operation of FIG. 2 upon closure of switch 38 can be described more graphically through the use of certain exemplary circuit values. For example, if $V_{IN}$ varies from 0 to +10 volts and amplifier 46 has an $\alpha$ of +3, then the voltage across resistor 50 will correspondingly vary from 0 to 20 volts as a function of $V_{IN}$. Now, assume also that resistor 50=20 KΩ; resistor 52=30 KΩ; resistor 34=20 KΩ; and source 56 provides +20 volts. If $V_{IN}=0$, then the current $I_{52}$ through resistor 52≅0.67 milliamp, no current flows through resistor 50, and the base current $I_B$ of transistor $Q_1$ is 0.67 milliamp. If now $V_{IN}=10$, then $I_C$ (the current flowing through resistor 34) becomes 0.5 milliamp, $I_{52}$ changes to about 0.33 milliamp, but $I_{50}$ (the current through resistor 50) becomes 1.0 milliamp. The total current $I_B$ driving base 44 then is the sum of $I_{50}$ and $I_{52}$ flowing at junction 54, i.e. 1.33 milliamps. It will be apparent that, depending upon the characteristics of transistor $Q_1$, one can judiciously select values for $\alpha$ of amplifier 46, the values of resistor 50 and 52, and the voltage of source 56, to provide a base current drive which will vary as a direct function of the input voltage (of a magnitude within a given voltage range) to the transistor so as to insure a zero (or at least a constant) IR drop across the transistor. Of course, amplifier 46, resistor 50 and 52, and source 56 can all be adjusted to provide more or less than the optimum $I_B$ and therefore provide a predeterminedly variable $V_{CE}/I_B$ if desired.

Figure 3:
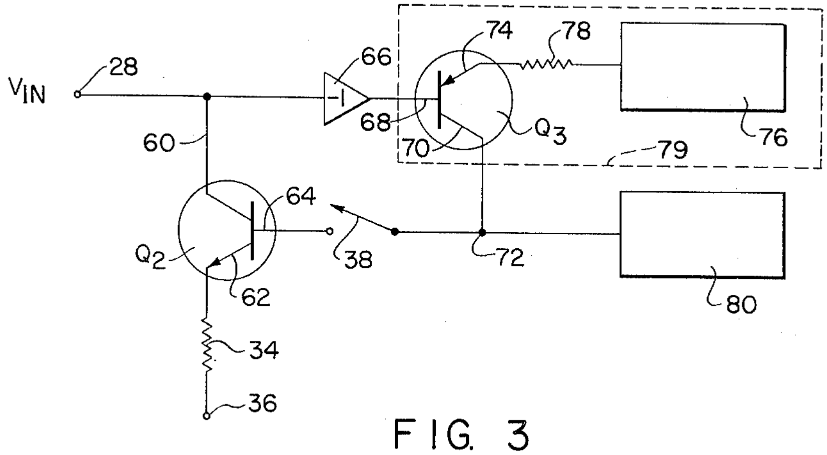
FIG. 3 is a schematic circuit diagram of another detailed form of the embodiment of FIG. 1.

Referring now to FIG. 3, the general principles of the invention are therein embodied in another circuit wherein the switching is to be done by transistor $Q_2$, the latter being shown as an npn type, connected for operation in the normal mode. Hence, collector 60 is connected to input terminal 28, whilst emitter 62 is connected through load resistor 34 to output terminal 36.

As means (corresponding to 32 of FIG. 1) for generating the requisite control or base drive current for base 64 of transistor $Q_2$ as a direct function of the magnitude of the input voltage signal to be switched, there is included an inverting amplifier 66 having preferably unity gain. Amplifier 66, for example, may be an operational amplifier of known type having its input connected directly to terminal 28. The output of amplifier 66 is connected to base 68 of transistor $Q_3$, which is intended to generate a variable current in accordance with variation in its base voltage. Consequently, transistor $Q_3$ is a pnp transistor having its collector 70 connected to summing junction 72 and thence connectable through switching means 38 to base 64 of transistor $Q_2$. Emitter 74 of transistor $Q_3$ is connected to a constant voltage source 76 through a dropping resistor 78. Transistor $Q_3$, resistor 78 and source 76 can be considered to constitute a variable current source denoted by numeral 79. Also included as part of the generator means is a constant current source 80 connected to summing junction 72.

The overall operation of the circuit of FIG. 3 is to provide the same function as the embodiment shown generally in FIG. 1 and specifically in FIG. 2. Current source 80 provides a constant bias current to transistor $Q_2$ in much the same manner as current source 56 provided such bias to transistor $Q_1$ in FIG. 2. This constant current allows the circuit designer to place a predictable offset voltage into the circuitry, and also to provide the requisite order of magnitude to the base drive current. The magnitude and direction of the latter is intended in both embodiments to be equal and opposite, over a range on input voltages, to the sum of the emitter and collector currents flowing in the switching transistor. In effect then, the base drive is selected by the generating means as a function of the input voltage to buck out the two diode drops in the switching transistor.

The operation of the circuit of FIG. 3, however differs in detail from that of the circuit of FIG. 2. Specifically, the input voltage $V_{IN}$ is applied in inverted form to the base of transistor $Q_3$, and controls the flow of current from source 76 through resistor 78, emitter 74 to collector 70 and to summing junction 72. At the latter, the input-voltage-controlled variable current is, for example, opposed by the flow of constant current from source 80. Hence the sum (difference) of the two currents provides the base drive $I_B$ flowing, in the example shown, out of base 64 through closed switching means 38. By proper choice, based on known transistor characteristics, the magnitudes and directions of the currents (from the variable and constant current sources) summed to provide $I_B$, can be easily selected to provide the constant, preferably substantially zero, voltage drops across the switching transistor. By adjustment of the two currents, switching accuracies within 1 millivolt can be maintained with 0 to 10 volt input signals. It will be appreciated that the base current drive $I_B$ provided to base 44 in the embodiment of FIG. 2 can also be said to be derived as the sum of a current from a constant source (56, 52) and a current from a variable source (46, 50).

Frequently, in devices by which an analog signal is to be switched with a high degree of accuracy, an inverter is employed. An example of such a device is an analog-to-digital converter wherein a bipolar input signal is handled by introduction into an operational amplifier with a gain of −1. Either the signal or its complement, i.e. the amplifier output is then available for selection. The present invention, particularly in the form shown in FIG. 3, is especially useful for improving the accuracy of switching in such devices wherein both the signal and its complement are available.

Figure 4:
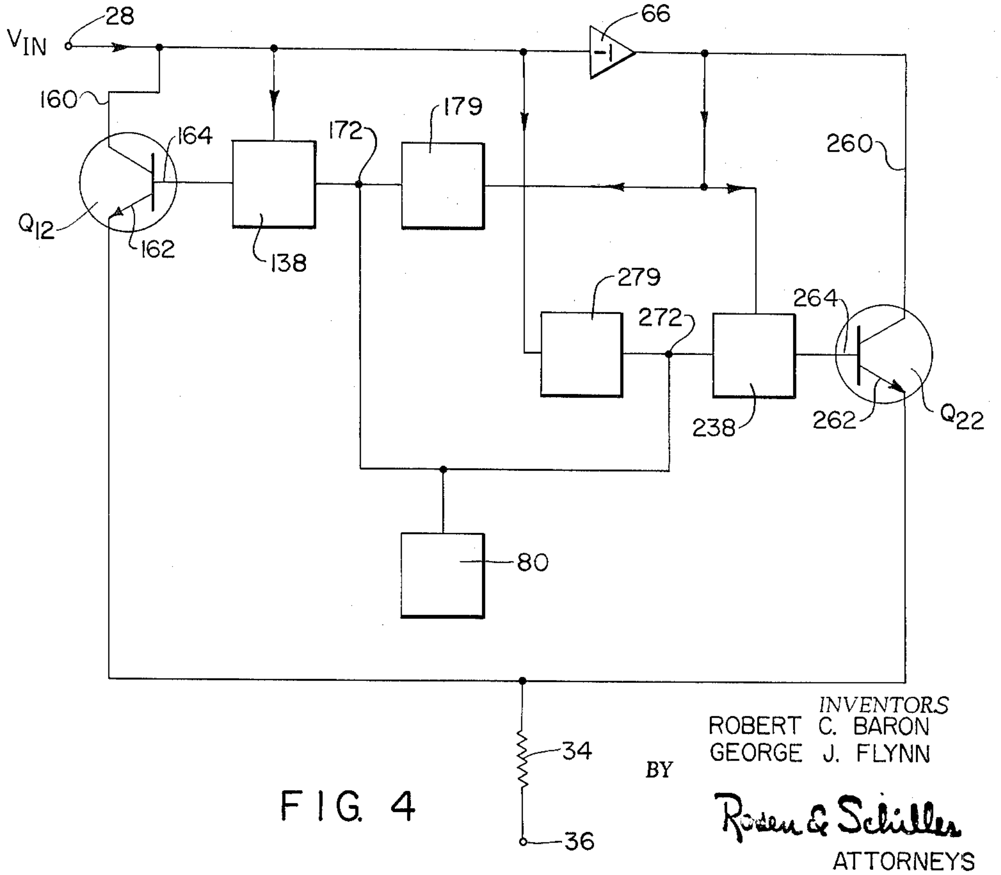
FIG. 4 is a block diagram showing the application of the switching device embodied in FIG. 3 in a selective switching circuit.

A typical circuit is shown in FIG. 4 wherein switching accuracy is improved according to the principles of the present invention.

The circuit of FIG. 4 includes a pair of switching loops; the three-digit number used in identifying the elements of the first loop, has the numeral 1 as the first digit. The first digit of the three-digit numeral employed to identify a corresponding element of the second loop therefore is the numeral 2. Where the last two digits of any number is like another, they denote like parts corresponding to one another and to elements of the other figures.

As will be seen, the embodiment of FIG. 4 incorporates a D.C., unity gain, inverting amplifier 66, typically of the operational type, having its input connected to input terminal 28. Terminal 28 is also connected to the input or collector lead 160 of first switching transistor $Q_{12}$. The output, in this instance emitter lead 162 of the latter, is connected through load resistor 34 to output terminal 36.

A similar alternate switching transistor $Q_{22}$ has its input or collector lead 260 connected to the output of amplifier 66. The output or emitter lead 262 of transistor $Q_{22}$ is also connected through resistor 34 to output terminal 36. If the circuit thus described were to be employed with a fixed base bias current to both transistors $Q_{12}$ and $Q_{22}$, a unipolar output signal would appear at terminal 36 regardless of the polarity of $V_{IN}$ at input terminal 28. However, the nature of the output signal $V_{OUT}$ at terminal 36 would be materially affected by the nature of the variable IR drops across each transistor responsive to variations in $V_{IN}$.

Consequently, the circuit of FIG. 4 includes a first compensating loop comprising a source 179 (similar to variable current source 79 of FIG. 3) and a fixed current source 80. The input to variable current source 179 is connected to the output of amplifier 66 so that current source 179 may generate its current as a function of the inverted signal provided by amplifier 66. The outputs of both the variable and constant current sources are summed at junction 172 and thence connectable to base 164 of transistor $Q_{12}$ through polarity responsive switch 138.

Similarly, the embodiment of FIG. 4 includes a second compensating loop comprising source 279 of a current which is variable as a function of the magnitude of the input voltage. The input of source 279 is connected to input terminal 28; the output of source 279 is summed, together with current from constant current source 80 at junction 272. The summed current thus provided is selectively applied to base 264 of transistor $Q_{22}$ through polarity responsive switch 238.

Now assume that $V_{IN}$ can vary between $\pm 10$ volts, and initially is at a positive value. The output of amplifier 66 is therefore of the same magnitude but of negative polarity. This negative potential, applied to variable current generator 179 provides a corresponding current $I_V$ which, for example, is less than the current $I_K$ provided by source 80 and is of opposite polarity. Assuming further that switch 138 allows the passage of current therethrough when $V_{IN}$ is positive, then the base of $Q_{12}$ is biased to allow transistor conduction, and the base drive is of a magnitude which adjusts for the diode drops of transistor $Q_{12}$.

Because in the embodiment shown, polarity responsive switch 238 is of the same type as 138, the negative polarity of the output of amplifier 66 maintains switch 238 in an OFF condition. No bias being applied to the base of transistor $Q_{22}$, the latter will not conduct. Hence, the voltage appearing across load resistor 34 is positive.

Now assume that $V_{IN}$ becomes negative. Switch 138 opens, removing the bias on base 164 of transistor $Q_{12}$, shutting the latter transistor off. The output of amplifier 66, being inverted, is now positive and actuates switch 284 into conduction, i.e. ON. The negative $V_{IN}$ applied to the input of variable current source 279 provides the requisite $I_V$. The latter is summed at junction 272 with $I_K$ from source 80 and applied through closed switch 238 to base 264 of transistor $Q_{22}$. Thus the output of transistor $Q_{22}$ will also provide a positive voltage across load resistor 34, the base drive for transistor $Q_{22}$ being adjusted in accordance with the magnitude of $V_{IN}$ to provide substantially zero IR drop across transistor $Q_{22}$.

Since certain changes may be made in the above apparatus without departing from the scope of the invention herein involved, it is intended that all matter contained in the above description or shown in the accompanying drawings shall be interpreted in an illustrative and not in a limiting sense. For example, the conductivity types for the transistors described may be reversed with appropriate changes in bias polarities as is well known in the art. Additionally, while transistor switching has been described in terms of conduction between the collector and emitter as controlled by the base, it will be recognized, for example, that a transistor can operate as a switch conducting along a base-emitter path, controlled by collector current. The principles of the present invention are readily applicable to transistors in the latter configuration. While the selective control of the switching of the transistors in the embodiment of FIG. 4 has been shown as polarity responsive, other selective mechanisms and parameters such as clock control can be employed.

What is claimed is:

1. In a transistor switching circuit, in combination:
   a transistor having input and output terminals across which an input signal of voltage variable within a predetermined range is intended to be switched, and having a control terminal adapted to have a control signal applied thereto for selectively initiating and terminating conduction between said input and output terminals;
   means responsive to said input signal for generating a drive current, said drive current being such a function of the voltage of said input signal as to compensate said transistor for variations in voltage drops thereacross during conduction due to the variations in the magnitude of said input signal; and
   means applying said drive current to said control terminal during conduction.

2. A transistor switching circuit, comprising in combination:
   a transistor having collector, emitter and base terminals;
   an input lead connected to one of said collector and emitter terminals;
   an output lead connected to the other of said collector and emitter terminals;
   a non-inverting amplifier having greater than unity gain, and having its input connected to said input lead;
   a resistive means connected between the output of said amplifier and a summing junction;
   a source of constant current connected to said summing junction; and
   means for connecting said summing junction to said base terminal.

3. A transistor switching circuit, comprising in combination:
   a first transistor having collector, emitter and base terminals;
   an input lead connected to one of said collector and emitter terminals;
   an output lead connected to the other of said collector and emitter terminals;
   inverting amplifier means having its input connected to said input lead;
   means for generating a variable current and comprising a substantially constant voltage source, a resistive element, and a second transistor;
   said second transistor including an input terminal connected through said resistive element to said voltage source, an output terminal connected to a summing junction, and a control terminal connected to the output of said inverting amplifier means;
   means for providing substantially constant current;
   means for summing said variable current and said constant current; and
   means for connecting the sum of said currents to said base terminal.

4. A selective, transistor, absolute-value switching circuit comprising, in combination:
   a first input terminal and a first output terminal;

a first switching transistor having an input terminal connected to said first input terminal, an output terminal connected to said first output terminal, and a control terminal;

an inverting amplifier having its input connected to said first input terminal;

a second switching transistor having an input terminal connected to the output of said amplifier, and output terminal connected to said first output terminal, and a control terminal;

means responsive to a signal applied at said first input terminal for generating a first current which is variable as a direct function of the voltage of said signal;

means for supplying substantially constant second current;

means for summing said first current and said second current;

means responsive to the inverted signal output of said amplifier for generating a third current which is variable as a direct function of the voltage of said inverted signal output;

means for supplying a substantially constant fourth current;

means for summing said third current and said fourth current;

means for connecting either the sum of said first and second currents to the control terminal of said second switching transistor or the sum of said third and fourth currents to the control terminal of said first switching transistor.

5. A switching circuit as defined in claim 4 wherein said means for connecting either sum of said first and second currents or the sum of said third and fourth currents are responsive to the polarity of said input signal.

6. A switching circuit as defined in claim 4 wherein said inverting amplifier has unity gain.

References Cited by the Examiner

UNITED STATES PATENTS 3,038,089 6/62 Kittrell et al. ---------- 307—88.5

ARTHUR GAUSS, *Primary Examiner.*